US012669802B2

(12) United States Patent
Martinez Canedo et al.

(10) Patent No.: US 12,669,802 B2
(45) Date of Patent: Jun. 30, 2026

(54) DISCOVER MATCH USE (DMU) AUTOMATION SYSTEM

(71) Applicant: Siemens Aktiengesellschaft, Munich (DE)

(72) Inventors: Arquimedes Martinez Canedo, Plainsboro, NJ (US); Hartmut Ludwig, West Windsor, NJ (US); Lingyun Wang, Princeton, NJ (US); Florian Ersch, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 257 days.

(21) Appl. No.: 18/262,094

(22) PCT Filed: Feb. 23, 2021

(86) PCT No.: PCT/US2021/019149
§ 371 (c)(1),
(2) Date: Jul. 19, 2023

(87) PCT Pub. No.: WO2022/182325
PCT Pub. Date: Sep. 1, 2022

(65) Prior Publication Data
US 2024/0094709 A1 Mar. 21, 2024

(51) Int. Cl.
G05B 19/4155 (2006.01)
(52) U.S. Cl.
CPC .................... G05B 19/4155 (2013.01); *G05B 2219/31368* (2013.01)

(58) Field of Classification Search
None
See application file for complete search history.

(56) References Cited

U.S. PATENT DOCUMENTS

| | | | | |
|---|---|---|---|---|
| 2008/0189636 | A1* | 8/2008 | Hood | H04L 12/40 715/764 |
| 2010/0042376 | A1* | 2/2010 | Weatherhead | G06F 8/10 703/1 |
| 2010/0280863 | A1* | 11/2010 | Wilcock | G06Q 10/067 705/348 |
| 2013/0131840 | A1* | 5/2013 | Govindaraj | G05B 19/41845 700/19 |
| 2018/0348742 | A1* | 12/2018 | Byrne | G05B 19/41885 |
| 2020/0097623 | A1* | 3/2020 | Palmer | G06Q 10/067 |
| 2020/0310394 | A1* | 10/2020 | Wouhaybi | H04L 67/1051 |

FOREIGN PATENT DOCUMENTS

| | | |
|---|---|---|
| CN | 102640068 A | 8/2012 |
| CN | 106527383 A | 3/2017 |
| CN | 111756809 A | 10/2020 |
| WO | 2008135459 A2 | 11/2008 |

* cited by examiner

*Primary Examiner* — David Earl Ogg

(57) ABSTRACT

Industrial automation systems are often inflexible, which can result in delays that are costly and inconvenient. In particular, it is recognized herein that the engineering phase of automation system implementation currently represents a significant portion of the overall cost of an automation system. As described herein, automation system configurations can be automatically generated. For example, a discover match use (DMU) system described herein can reduce engineering time while providing design flexibility.

8 Claims, 7 Drawing Sheets

702 RECEIVE SKILLS/WORKFLOWS

704 MATCH PRODUCERS TO CONSUMERS

706 RESOLVE WORKFLOWS

708 BIND FUNCTIONS TO HARDWARE

710 TRACK TRANSACTIONS

600

602 IDENTIFY FUNCTIONS

604 GENERATE TOOLS FROM FUNCTIONS

606 SHARE TOOLS AMONG MODELS

608 DEPLOY SKILLS/WORKFLOWS TO RUNTIME

610 PERFORM OPTIMIZATIONS

DISCOVER MATCH USE (DMU) AUTOMATION SYSTEM

BACKGROUND

Automation systems can be used to control the operation of machines and other components in a systematic manner. Automation systems can include various automation domains such as factory automation, process automation, building automation, energy automation, and the like. Automation systems can also include equipment from multiple vendors. In some cases, equipment and machines within an automation system may use varying mechanisms associated with their respective ecosystems, such as varying runtime environments, protocols, and programming languages (e.g., vendor-specific programming languages). By way of example, automation functions are often platform specific and/or are implemented in a proprietary manner. Thus, generating an automation function that is interoperable with other automation functions can be cumbersome and time-consuming.

Further, today's automation systems are often hard-wired, such that hardware (e.g., production machines, robots, CNC machines) is bound with software in a particular configuration at an engineering phase. During runtime, such a system remains in its particular configuration. In some cases, when there is a new requirement (e.g., new hardware) for the system or the system otherwise needs to be reconfigured, such a system is stopped from operating while it is re-engineered or reconfigured.

It is recognized herein that such inflexible systems can result in delays that are costly and inconvenient. It is also recognized herein that the engineering phase of automation system implementation currently represents a significant portion of the overall cost of an automation system.

BRIEF SUMMARY

Embodiments of the invention address and overcome one or more of the described-herein shortcomings or technical problems by providing methods, systems, and apparatuses for automatically generating automation system configurations. For example, a discover match use (DMU) system described herein can reduce engineering time while providing design flexibility.

In an example aspect, a method can be performed in an industrial system that includes a plurality of machines that define respective hardware and automation services associated with the hardware. A discover module of the industrial system can discover the plurality of machines and the associated automation services. A match module of the industrial system can obtain one or more production goals associated with an object. At runtime of the industrial system, based on the one or more production goals, a set of the automation services can be selected so as to define a composite service. During runtime of the industrial system, the composite service can be triggered so as to produce the object. Based on discovering the plurality of machines and the associated automation services, a catalog of automation services can be built. In some examples, the discover module can continuously interrogating the automation services. In response to the interrogating, the discover module can receive respective statuses from the automation services. Based on the statuses, the catalog can be updated so as to define a live catalog of available automation services that changes over time. In an example, responsive to the triggering, the system can produce the object using a set of the plurality of machines associated with the set of automation services. While producing the object, the system can identify one or more new automation services, and based on the one or more new automation services, the system can select a different set of the automation services so as to define the composite service. Additionally, or alternatively, based on a change in policy associated with the one or more production goals, the system, in particular the match module, can selecting a different set of the automation services so as to define a different composite service. Further, during runtime of the industrial system, the different composite service can be triggered so as to continue producing the object.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 4 depicts an example match phase of the DMU service, in accordance with an example embodiment.

DETAILED DESCRIPTION

By way of introduction, in accordance with various embodiments, a discover match use (DMU) automation system can be reconfigured to accommodate lot-size one products and changing environments, so as to dramatically reduce engineering time that is spent in designing automation systems. In various examples, the DMU automation system can define a continuous and automated discovery of resources and their capabilities. The DMU automation system can also match production needs with discovered resources, and use production resources or services such that various services can interoperate with one another.

As an initial matter, the engineering phase of automation system implementation typically consists of programming and configuration. By way of example, programming generally includes the development of the logic of the system (e.g., conditions) and configuration generally includes the adjustment of parameters of the system. It is recognized herein that programming and configuration are tightly coupled in today's automation system implementations. By way of example, Siemens Totally Integrated Automation (TIA) Portal projects typically begin with hardware configuration (configuration) that is followed by programming. In some cases, the engineered design is refined via iterations of changing the configuration or programming and evaluating the effects on the other of the configuration or programming. Further, it is recognized herein that existing automation engineering approaches typically hardcode the software to the hardware, which can force the iterative process for engineering described above. It is further recognized herein that, in existing approaches, changes in the runtime can also force further iterations and refinements of engineering (or re-engineering).

In accordance with various embodiments described herein, programming can be front-loaded and configuration can be back-loaded. Front-loading generally refers to programming that is done prior to configuration or runtime. Back-loading generally refers to configuration that is performed after programming is performed or during runtime. In particular, in an example, the DCU automation system determines and selects hardware on which to run automation code at runtime, so as to reduce front-loading time and cost associated with the engineering phase.

Figure 1:
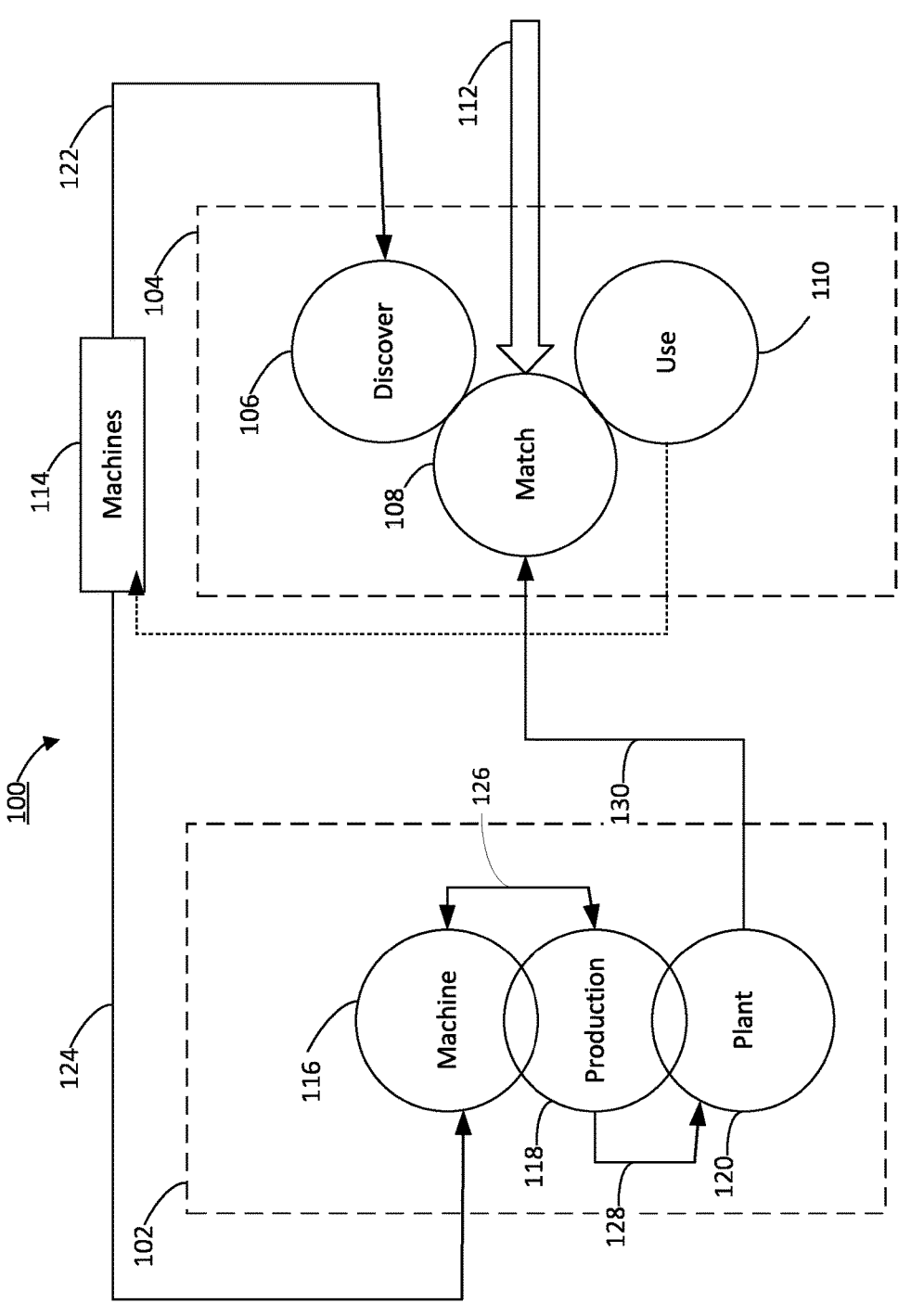
FIG. 1 is a block diagram of an example automation system that depicts an engineering phase and a runtime phase, in accordance with an example embodiment.

Referring to FIG. 1, a DMU automation system 100 defines a frontloading or engineering phase 102 and a backloading or runtime phase 104. During runtime 104, the automation system 100 can perform one or more discoveries, matches, and uses. In particular, the automation system 100 can include one or more program modules configured to perform various operations during runtime 104. For example, the automation system 100 can include a discover module 106 configured to discover automation machines, functions, and services, which can generally be referred to as resources. The automation system 100 can include a match module 108 configured to match production or operational needs with resources. The automation system 100 can further include a use module 110 configured to utilize or coordinate resources so as to meet the production or operational needs.

It should be appreciated that functionality described as being supported by program modules of the automation system 100 may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules. Thus, it will be also understood that the automation system 100 is simplified to illustrate an example, and the automation system 100 can vary as desired, and all such automation systems are contemplated as being within the scope of this disclosure.

With continuing reference to FIG. 1, at 112, a product can be ordered in accordance with an example. Product orders can be received by the match module 108. In some cases, the product order at 112 can be generated on one or more engineering applications that are deployed on the cloud that is in communication with the match module 108. In various examples, the product order at 112 can define a small quantity for production, an order that is manufactured in a single run, or the like, so as define a lot size one product order. In some cases, such lot size one product orders can rely on a digital twin to fulfill the order. In particular, for example, the automation system 100 can include various physical entities, such as actuators, which change and control the real world's state so as to fulfill the order. The digitalized state of such physical entities can be preserved in a digital twin, which can refer to the process image of the current state of the physical system. The automation system 100, for instance the match module 108, can determine production needs based on the product order at 112. Further, the automation system 100, in particular the match module 108, can match the production needs with resources that are discovered by the discover module 106, as further described herein.

Still referring to FIG. 1, the automation system 100 can include various machines, for instance a plurality of pay-per-use machines 114. The machines 114 can be associated with a plurality of automation services. For instance, each machine 114 can perform one or more automation services. The discover module 110 can be configured to discover the plurality of machines 114. The machines 114 can provide skills or functions as a service, and can be discovered by the discover module 106. Unless otherwise specified, skills, functions, and services can be used interchangeably herein without limitation. In some examples, the discover module 106 can be configured to interrogate the machines 114 or the associated automation services, for instance continuously, periodically, or in response to an event. By way of example, events that trigger an interrogation can include a new machine 114 being deployed, a new sensor being deployed, a service subscription changing, or the like. In response to the interrogating, at 122, the discover module 106 can receive respective statuses from the automation services. Thus, in various examples, the machines 114 can be configured to communicate their respective capabilities or skills. Based on the statuses, the discover module 106 can configured to update an inventory, for instance a catalog, of available automation services. Thus, for example, a live catalog or dynamic inventory of automation services that changes over time can be maintained by the discover module 106. Further, in some cases, the discovery module 106 can identify available services without knowledge of how the services will be used.

The skills or functions that the machines 114 can provide can be developed in any language as desired. The engineering phase 102 can include various engineering tools or programming modules, such as, for example, a machine programming module 116, a production programming module 118, and a plant programming module 120. In some cases, the machine programming module 116, the production programming module 118, and the plant programming module 120 can be programmed prior to configuration, so as to define the frontloading phase 102. During the frontloading 102, various engineering tools can be generated by stacking, stitching, specializing, and/or deploying engineering functions, for instance functions defined by the pay-per-use machines 114. In some cases, the machine programming module 116 can utilize skills from the machines 114 so as to expedite development cycles of the machines 114, for instance by using containerization. For example, at 124, the machine programming module 116 can receive the skills associated with the machines 114. At 126, the machine programming module 116 can process the skills so as to define composed skills that the production programming module 118 can processes. Using the composed skills, the production programming module 118 can define generate partially completed workflows, which can be shared with the plant programming module 120, at 128. Using the partially completed workflows, the plant programming module 120 can generate composed workflows, which can be shared with the match module 108, at 130. In various examples, the engineering or frontloading phase 102 can also include cognitive engineering services. For example, such cognitive engineering services can include AI and/or data analytics that improve engineering productivity.

The discover module 106, the match module 108, and the use module 110 can collectively define or be referred to as a discover match use (DMU) service. In accordance with various embodiments, the backloading or runtime phase 104 can define the DMU service. In some cases, the DMU service can discover machines 114 and their associated skills in a factory, match orders to particular machines based on policies, and wire workflows on-the-fly so as to trigger the use of the selected or matched machines. For example, the match module can obtain one or more production goals associated with an object. At runtime, based on the production goals, the match module 108 select a set of the available automaton services so as to define a composite automation service. Continuing with the example, during runtime of the industrial system, the match module 108 can trigger the composite service so as to produce the object. Thus, the backloading 104 can define a zero effort engineering in which changes to policies and rules optimize production at runtime. The deployment of the DMU service can be seamless, in some cases, for example, by using DevOps and containerization.

Figure 2:
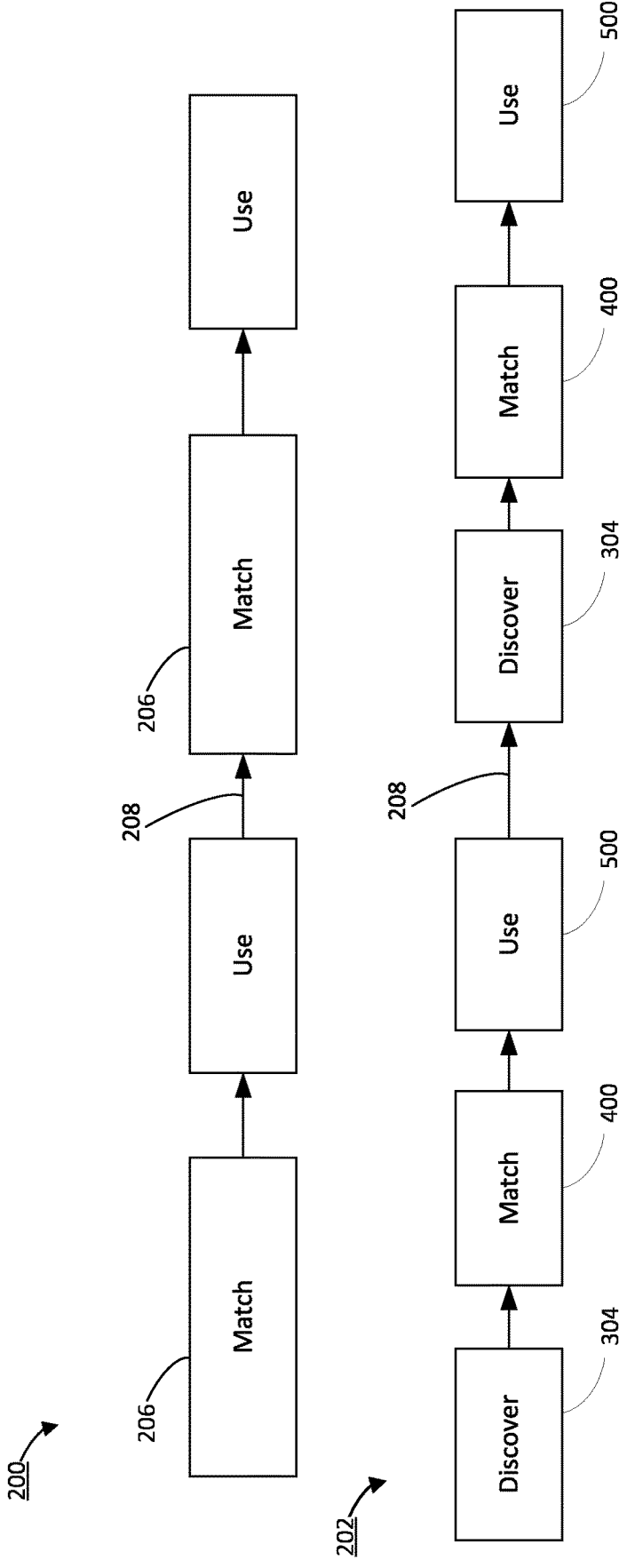
FIG. 2 is a block diagram that illustrates a comparison between an existing downtime process and an example discover-match-use (DMU) service pattern in accordance with an example embodiment.

Referring also to FIG. 2, an example downtime loop 200 is compared to an example DMU pattern 202. The downtime loop 200 represents an example current approach to automation engineering, and the DMU pattern 202 represents automation engineering according to an example embodiment. It is recognized herein that the downtime loop 200 typically includes automation that is hard-wired. In particular, for example, hardware and software is often bound together in current approaches at the engineering phase so as to define a system configuration that must be used at runtime. In such a scenario, in some cases, the system must be stopped and reengineered when a reconfiguration is needed, for instance when the system accommodates one or more new requirements (e.g., new hardware). Without being bound by theory, it is recognized herein that such reconfigurations are a reason that, in some cases, the engineering phase can account for around 50% of the total cost of automation in current approaches to automation implementation. By way of further example, software functions are often hard-wired within an automation program in current approaches. In such a scenario, in some cases, software functions are bound together in an automation program such that the exact automation program must be executed at runtime. It is recognized herein that such hard-wiring of functions can limit the flexibility that is often inherent in software.

The DMU pattern 202 can help illustrate limitations of current automation practice. Referring to FIG. 2, the downtime loop 200 defines a match phase 206 that is manual and offline. In the example, because the match phase 206 hard-wires the automation components together, there is no need for a discovery phase, for instance a discovery phase 304 (see FIG. 3). As a consequence, after commissioning a given system in accordance with the downtime loop 200, the hard-wired automation configuration is used at runtime such that the configuration is inflexible to, for example, changes in production requirements, which can be referred to as changes 208. Such changes 208 can include, for example and without limitation, implementing new hardware that becomes available, retrofitting of a production line, producing a new product, replacing an old machine for a new one, or the like. One or more changes 208 to production or requirements can break the automation system, such that the production needs to be stopped and re-engineered, for example, by manually matching and thus hard-wiring a new automation solution or configuration. It is recognized herein that the match phases 206 can be time-consuming, error prone, and/or limited to a narrow use-case. Further, the hard-wired match phase 206 of today can require significant engineering effort because of the lack of interoperability between automation components, among other reasons. In particular, custom and one-of-a-kind solutions are often developed today to allow multiple automation services (e.g., hardware and software) to work together.

In contrast, the DMU pattern 202 can define automation components that are interoperable with each other. Thus, referring also to FIG. 1, any two automation services within the automation system 100 can talk to each other, such that the automation system 100 can define a dynamic automation network architecture rather than an automation pyramid. In some examples, an automation service within the automation system 100 provides an interface for other automation services. The interface can inform other services of a given automation service's existence, status, physical location, and/or service it provides. Additionally, or alternatively, the interface can indicate parameters that are available from the associated automation service, inputs that are required into the given automation service, and/or outputs that the given automation service produces. Discovery of automation services can be performed at runtime in a centralized or decentralized manner.

Figure 3:
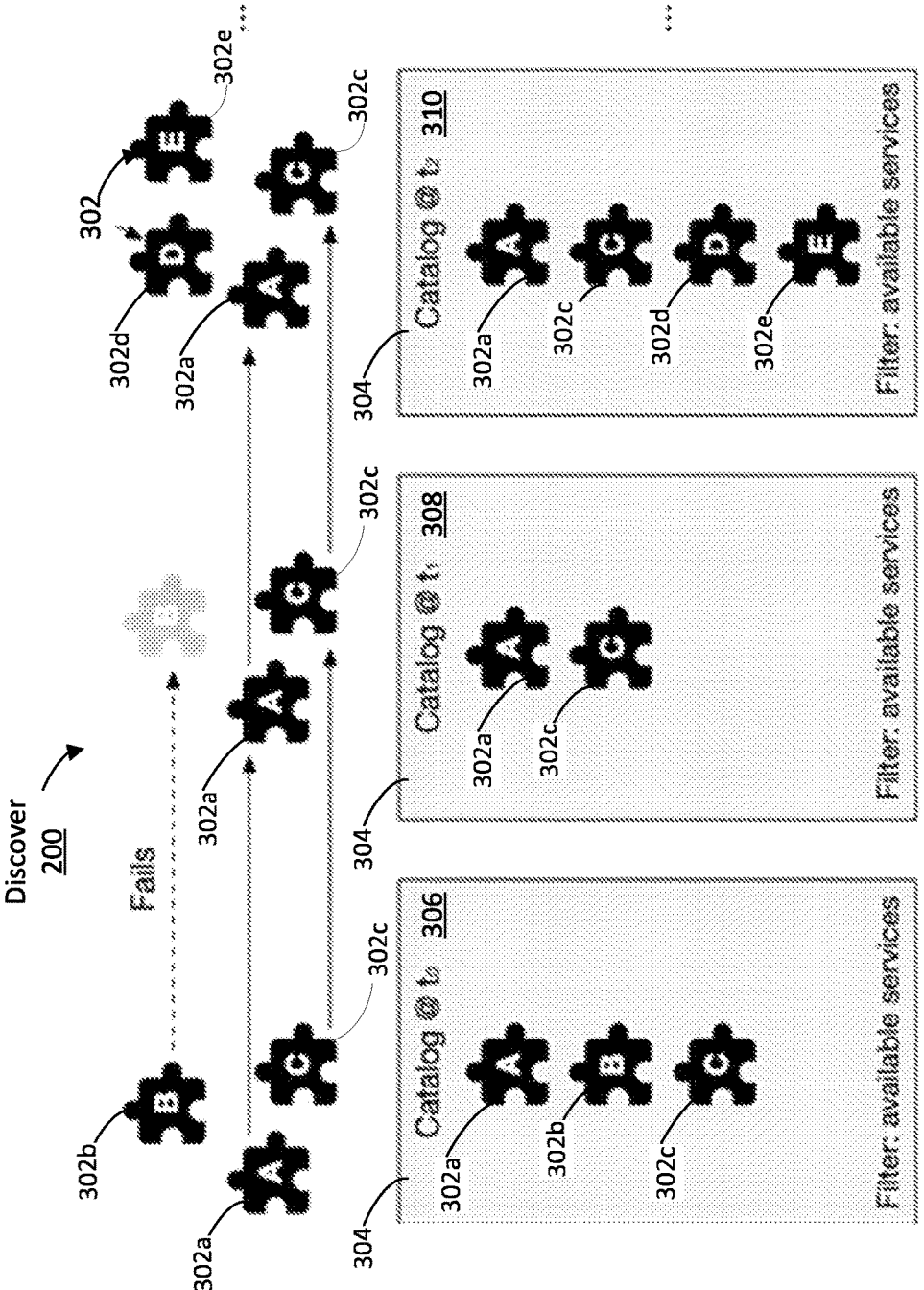
FIG. 3 depicts an example discover phase of the DMU service, in accordance with an example embodiment.

Referring to FIG. 3, an example discovery phase 304 is shown that can be performed within the example system or network 100. The discovery phase 304 can be performed by the discover module 106. During the discovery phase 304, one or more automation services 302 can be discovered, for instance a first automation service 302a, a second automation service 302b, a third automation service 302c, a fourth automation service 302d, or a fifth automation service 302e. It will be understood that the number and type of automation services that can be discovered can vary as desired. In some examples, during the discovery phase 304, the automation services 302 in the network are continuously interrogated. Based on the interrogations, a live catalog or inventory 304 of automation services 302 can be built, which can also be referred to as service registry. It is recognized herein that service registries typically work on a specific software ecosystem, so as to define catalogs of services within that ecosystem. In various embodiments, however, the service registry can build a live catalog of automation services across ecosystems.

With continuing reference to FIG. 3, at a first time 306 ($t_0$), the example catalog 304 includes the first automation service 302a, the second automation service 302b, and the third automation service 302c. At a second time 308 ($t_1$) that is after the first time 306, in accordance with the example, the second automation service 302b fails. In response to the failure, the catalog 304 is updated to reflect that the available services as of the second time 308 are the first automation service 302a and the third automation service 302b. At a third time 310 (t₂) that is after the second time 308, new services, in particular the fourth automation service 302d and the fifth automation service 302e, become available. In response to the new services becoming available, the catalog 304 is updated to reflect that the available services as of the third time 310 are the first automation service 302a, the third automation service 302c, the fourth automation service 302d, and the fifth automation service 302e. In some cases, updates and revisions to the catalog 304 can continue indefinitely as available services change. In various examples, each of the automation services 302 can define a respective interface that connects to other automation services, for example, in arbitrarily complex compositions of automation services.

Figure 4:
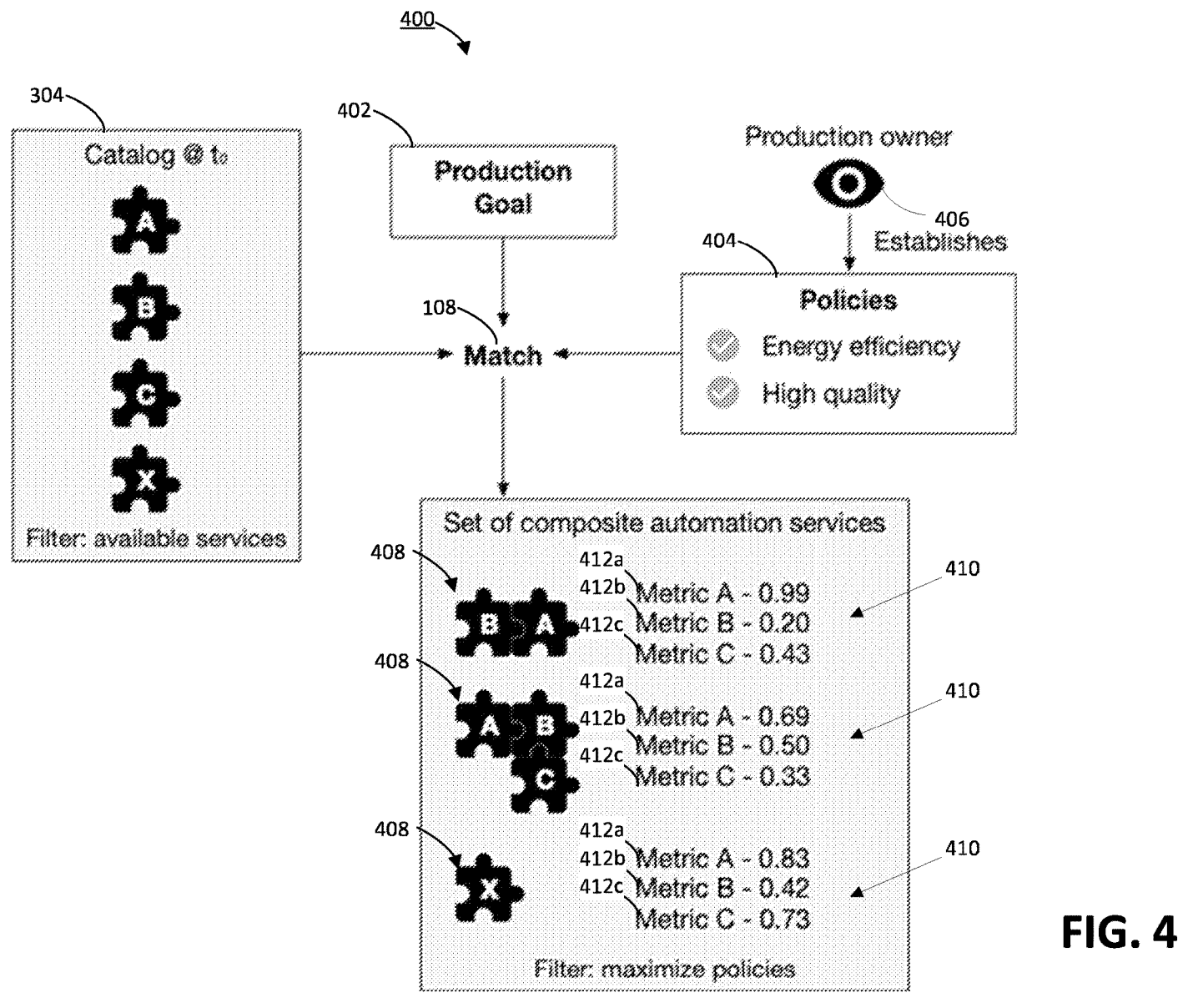

Referring also now to FIG. 4, an example match phase 400 is shown that can be performed within the example system or network 100. The match phase 400 can be performed by the match module 108. For example, during the match phase 400, the match module 108 can combine or compose various automation services 302 at runtime in such a way that the resulting configuration fulfills one or more production goals 402. As an illustrative example, and without limitation, the production goals 402 can define what needs to be produced by what time. For example, the production goals 402 can stipulate that ten cars of a first model and five cars of a second model are produced by tomorrow at noon. In some cases, the production goals 402 can be qualified by one or more policies 404. A given policy 404 can indicate that a course of action that is adopted or required by a production owner 406. Thus, the policies 404 can guide associated production outcomes. To further illustrate, continuing with the above-described example, example production policies 404 can be associated with energy efficiency or product quality, among other categories. An example energy efficiency policy might stipulate a maximum throughput for new product orders when energy prices are unusually high. A product quality policy might stipulate a minimum quality for products that are used in particular (e.g., special) environments. In some cases, the policies 404 are not mutually exclusive, and thus can be combined. Furthermore, in various examples, the policies 404 can change at any time to accommodate different constraints. By way of example, during the night energy prices might be lower as compared to daytime, and thus a given energy efficiency policy might not apply at night, is no longer a desired policy.

With continuing reference to FIG. 4, during the match phase 400, the match module 108 can receive as input the catalog 304 of automation services 302 associated with the corresponding time. During the match phase 400, the match module 108 can also receive one or more production goals 402, for instance production goals 402 that describe what needs to be produced. Additionally, or alternatively, during the match phase 400 the match module 108 can receive one or more production policies 404 specified by the production owner 406. Based on the received inputs, during the match phase 400, the match module 108 can determine compositions of automation services 304 that achieve the production goals 402 and fulfill, in some cases, the policies 404. Such compositions or combinations of automation services can be referred to as composite automaton services 408, as shown in FIG. 4. In various embodiments, the match module 108 uses scheduling, planning, constraint satisfaction, skill matching, optimization, and the like to create one or more composite automation services 408 on its own. In various examples, such composite automation services 408, or matched automation services, can achieve the production goal while maximizing the associated production policies.

In some cases, for instance when the DMU pattern works across ecosystems, a given composite automation service 408 might not be sufficient to accomplish interoperability with a particular ecosystem. In an example embodiment, a connector printer can function to automatically generate interface mappings from a given composite automation service 408 to the ecosystem-specific software stack. Thus, in accordance with various embodiments, the match module 108 can perform a match service that builds composite automation services 408 that satisfy a set of policies, and the connector printer can map the composite automation services 408 to ecosystem-specific implementations.

Referring again to FIG. 4, each of the composite automation services 408 can define one or more quantitative estimates 410. In various examples, the quantitative estimates 410 can each be associated with a metric, for instance a first metric 412a, a second metric 412b, or a third metric 412c, though it will be understood that the quantitative estimates 410 can be associated with alternative or additional metrics in accordance with various embodiments. Thus, the quantitative estimates can vary based on metrics. In various examples, the composite automation services 408 are reusable, thereby reducing the computational complexity of the match phase 400. In some cases, machine learning can be used to continuously learn the effectiveness of the composite automation services 408. In particular, for example, active learning (e.g., machine learning) can establish a relationship between the production goal 402, catalog 304, and policies 404. Over time, in some cases, such active learning can reduce or eliminate the overhead related to the match phase 400, thereby increasing the efficiency of a given DMU system, for instance the automation system 100.

Figure 5:
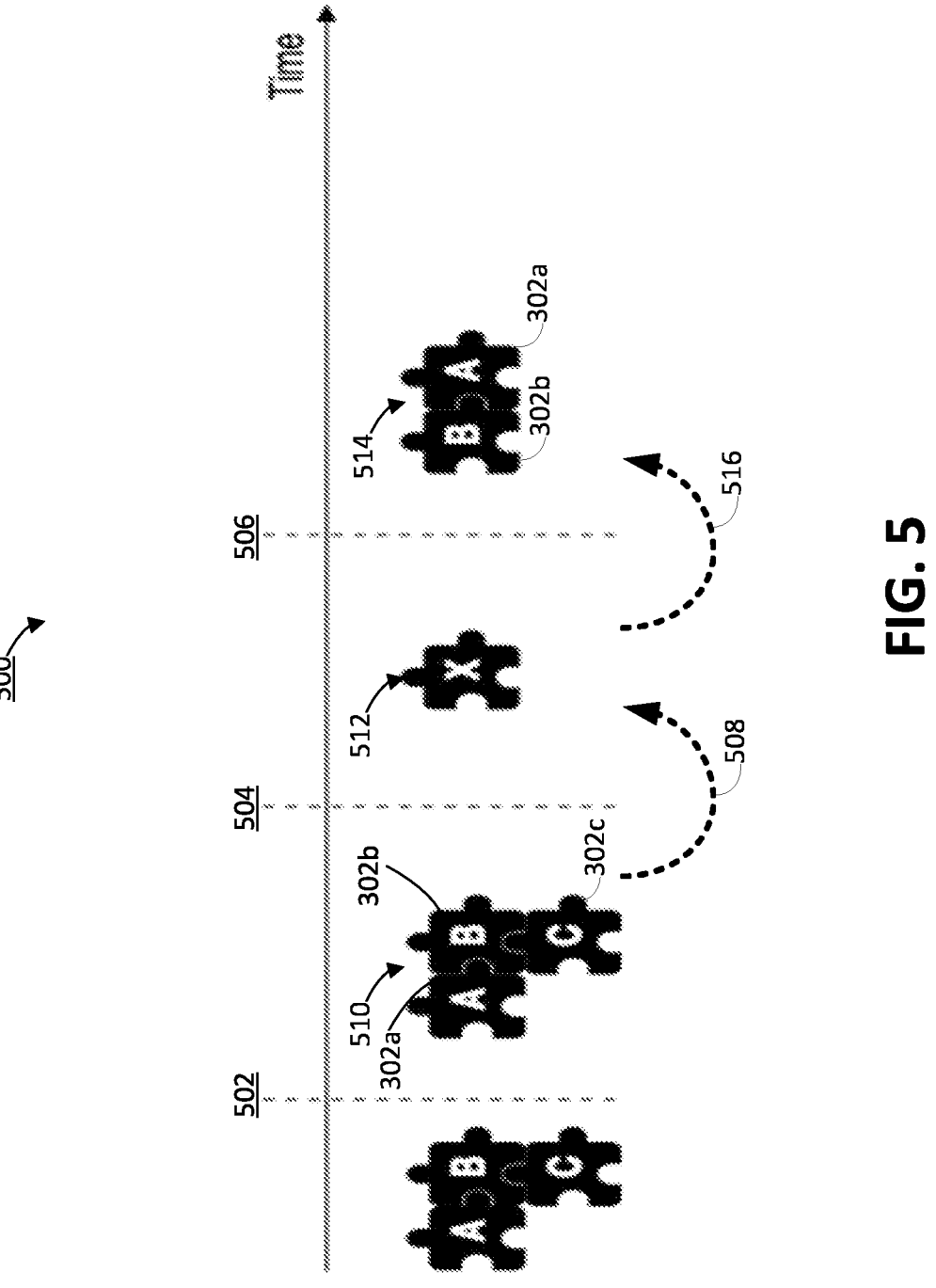
FIG. 5 depicts an example use phase of the DMU service, in accordance with an example embodiment.

Referring now to FIG. 5, an example use phase 500 is shown that can be performed within the example system or network 100. In particular, the use phase 500 can be performed by the use module 110 so as to execute an automation solution generated by the match module 108, for instance during the match phase 400. In accordance with various embodiments, the automation services 302 can be re-wired during the use phase 500 so as define composite automation services, or software functions, that change during the use phase 500. By way of example, referring to FIG. 5, at a first time 502, the use module 110 can use a first composite service 510 that is generated by the match module 108. The first composite service 510 can include the first automation service 302a, the second automation service 302b, and the third automation service 302c. At a second time 504 that is after the first time 502, in accordance with the example, the use module 110, during the use phase 500, changes utilize a second composite service 512 so as to define a first on-the-fly rewiring operation 508. Continuing with the example, at a third time 506 that is after the second time 504, the use module 110, during the use phase 500, changes to utilize a third composite service 514 so as to define a second on-the-fly rewiring operation 516. The third composite service 514 can include the first automation service 302a and the second automation service 302b without the third automation service 302c. It will be understood that the use module 110 can perform alternative or additional on-the-fly operations as desired, and all such operations are contemplated as being within the scope of this disclosure.

Figure 6:
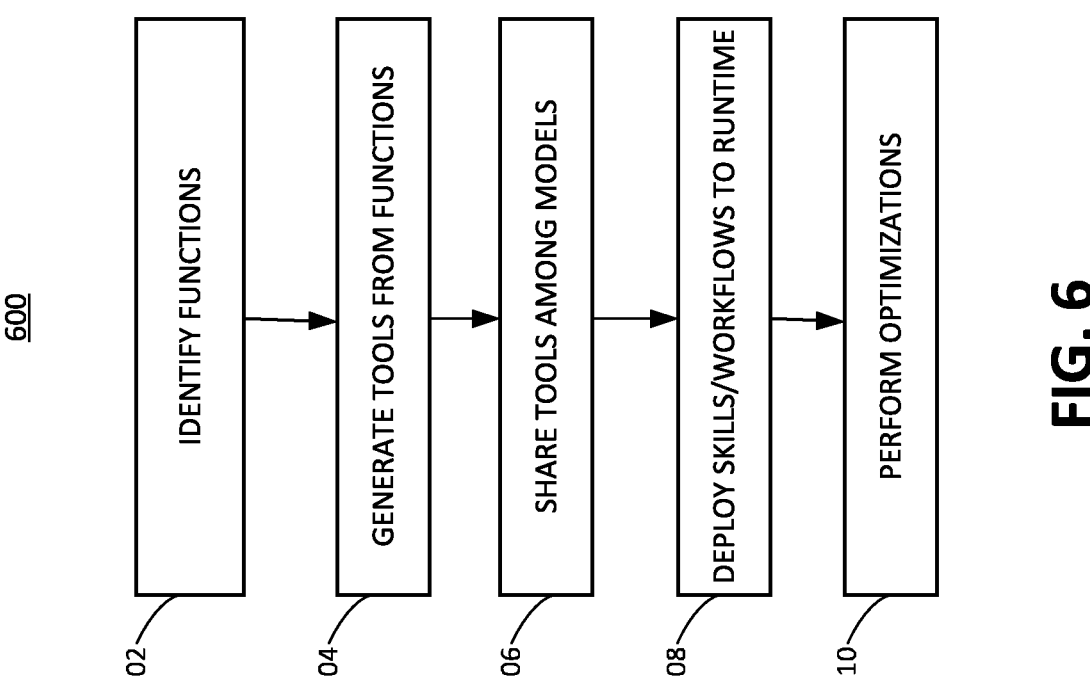
FIG. 6 is a flow diagram that depicts example operations that can be performed during the engineering phase, in accordance with an example embodiment.

Referring again to FIG. 1, in accordance with various embodiments, a DMU system architecture, for instance the DMU automation system 100, consists of an engineering portion and a runtime portion. In particular, frontloaded programming, for instance generating skills and partially complete workflows, can be performed during the engineering phase 102. In various examples, the discover, match, and use services described herein are performed during the runtime phase 104, so as to provide compositions of skills that complete the workflows. Referring also to FIG. 6, various operations, for instance example operations 600, are performed during the engineering phase 102, for instance by the system 100. At 602, composable engineering functions are identified. Such composable engineering functions can cover existing and engineering requirements. At 604, engineering tools can be created from the composable engineering functions. For example, the engineering functions can be stacked or stitched with each other so as to define a composite function or service that can be specialized for a particular purpose. In some cases, the system 100 can include an engineering engine that can generate the engineering tools from the composite functions. The engineering engine can define an execution and management environment for the engineering functions. In an example, the engineering engine includes the machine programming module 116, the production programming module 118, and the plant programming module 120. In various examples, the engine can be deployed in the cloud or edge using containers and DevOps. At 606, information, for instance engineering tools, can be shared among various engineering engines or models, so as to re-use tools or models at different levels. At 608, the engineering functions, for instance the composite functions or services that can include skills and workflows, are deployed to the runtime phase 104. Thereafter, at 610, the DMU service hosted during the runtime 104 can perform optimizations of workflows, for example, based on policies and matches between produces and consumers of services.

Figure 7:
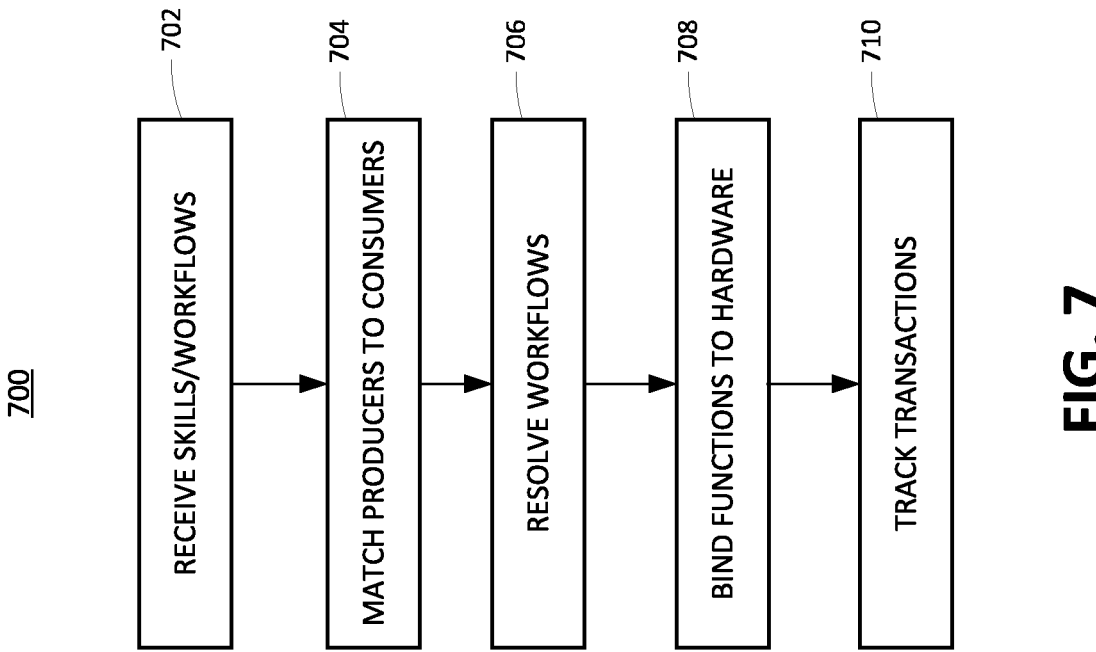
FIG. 7 is a flow diagram that depicts example operations that can be performed during the runtime phase, in accordance with an example embodiment.

Referring also to FIG. 7, various operations, for instance example operations 700, are performed during the runtime phase 104 in accordance with various embodiments, for instance by the system 100. At 702, in accordance with the example, the DMU service, for instance the match module 108, can receive skills and partially completed workflows, for instance from the engineering phase 102. In various examples, partially completed workflows can be generated manually or automatically. As described herein, at 704, the match module 108 can perform a match service so as to connect producers, for instance machines and/or or skills, to consumers, for instance partially completed workflows, based on one or more policies. At 706, during runtime, the workflows can be fully resolved so as to define on-the-fly software wiring. Fully resolved workflows can define various composite automation services or functions that can change over time. By way of example, a given workflow or composite automation service can change in response to a change of policy. Further, at 708, after the workflows are completed, the functions in a given workflow can be bound to specific hardware during runtime, so as to define on-the-fly software binding to hardware. By way of example, a first function or composite service can be bound to a specific hardware at a first time. At a second time after the first time, the first function or composite service can be bound to different hardware. At 710, during runtime, the use module 110 tracks the transactions that occur between functions or services, and transactions that occur between software and hardware. Continuing with the aforementioned example, the use module 110 can record the transaction defined by the first function or composite service being bound to different hardware at a second time that is after the first time. Such recording can define various runtime data, such as which machines are used for which processes, how often different machines or services are used, or the like. The data can be used to generate statistics, for example, that can be accessible via a user dashboard or the like.

Figure 8:
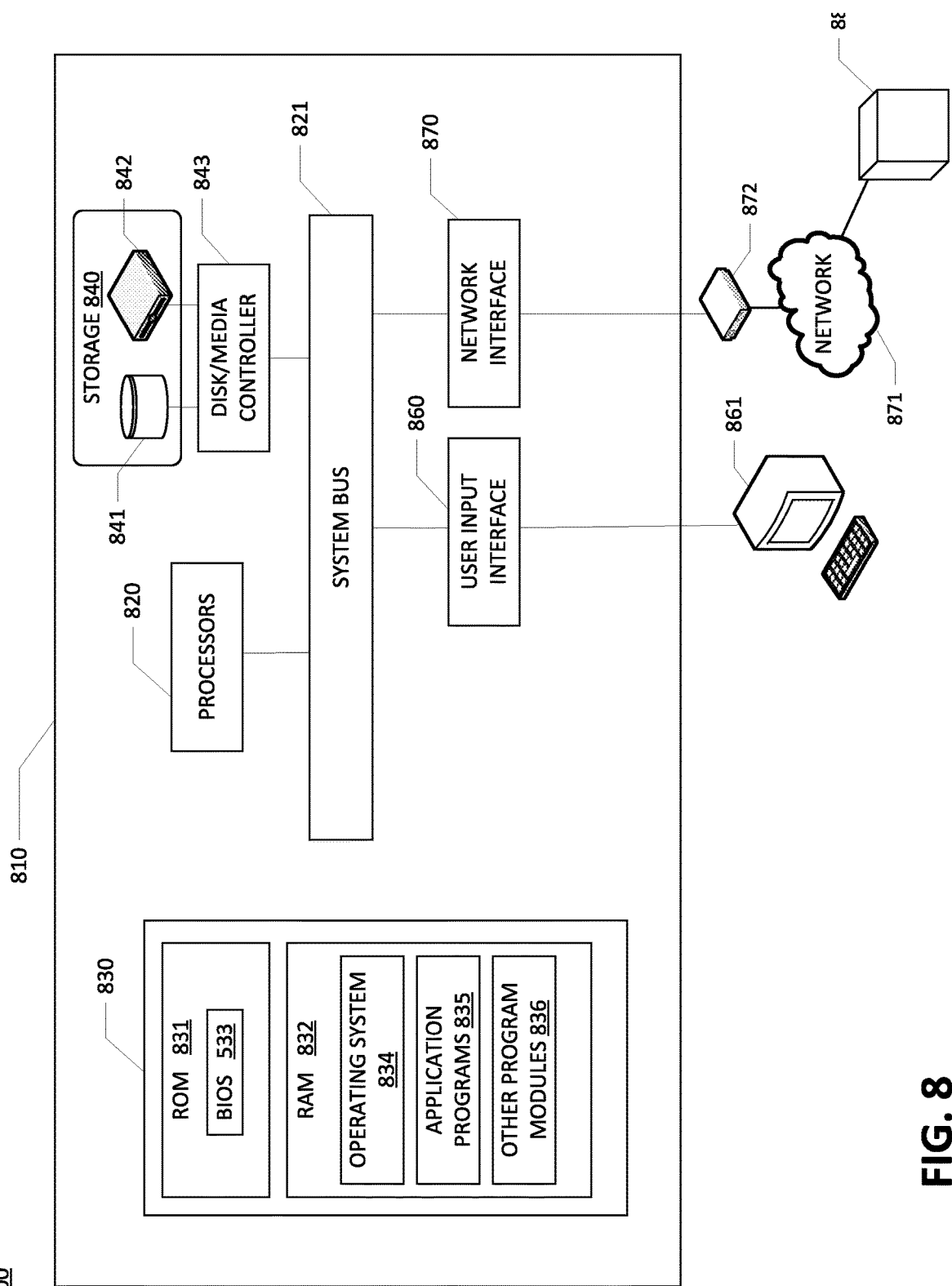
FIG. 8 shows an example of a computing environment within which embodiments of the disclosure may be implemented.

FIG. 8 illustrates an example of a computing environment within which embodiments of the present disclosure may be implemented. A computing environment 800 includes a computer system 810 that may include a communication mechanism such as a system bus 821 or other communication mechanism for communicating information within the computer system 810. The computer system 810 further includes one or more processors 820 coupled with the system bus 821 for processing the information. The industrial system 100 may include, or be coupled to, the one or more processors 820.

The processors 820 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 820 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 821 may include at least one of a system bus, a memory bus, an address bus, or a message bus, and may permit exchange of information (e.g., data (including computer-executable code), signaling, etc.) between various components of the computer system 810. The system bus 821 may include, without limitation, a memory bus or a memory controller, a peripheral bus, an accelerated graphics port, and so forth. The system bus 821 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 8, the computer system 810 may also include a system memory 830 coupled to the system bus 821 for storing information and instructions to be executed by processors 820. The system memory 830 may include computer readable storage media in the form of volatile and/or nonvolatile memory, such as read only memory (ROM) 831 and/or random access memory (RAM) 832. The RAM 832 may include other dynamic storage device(s) (e.g., dynamic RAM, static RAM, and synchronous DRAM). The ROM 831 may include other static storage device(s) (e.g., programmable ROM, erasable PROM, and electrically erasable PROM). In addition, the system memory 830 may be used for storing temporary variables or other intermediate information during the execution of instructions by the processors 820. A basic input/output system 833 (BIOS) containing the basic routines that help to transfer information between elements within computer system 810, such as during start-up, may be stored in the ROM 831. RAM 832 may contain data and/or program modules that are immediately accessible to and/or presently being operated on by the processors 820. System memory 830 may additionally include, for example, operating system 834, application programs 835, and other program modules 836. Application programs 835 may also include a user portal for development of the application program, allowing input parameters to be entered and modified as necessary.

The operating system 834 may be loaded into the memory 830 and may provide an interface between other application software executing on the computer system 810 and hardware resources of the computer system 810. More specifically, the operating system 834 may include a set of computer-executable instructions for managing hardware resources of the computer system 810 and for providing common services to other application programs (e.g., managing memory allocation among various application programs). In certain example embodiments, the operating system 834 may control execution of one or more of the program modules depicted as being stored in the data storage 840. The operating system 834 may include any operating system now known or which may be developed in the future including, but not limited to, any server operating system, any mainframe operating system, or any other proprietary or non-proprietary operating system.

The computer system 810 may also include a disk/media controller 843 coupled to the system bus 821 to control one or more storage devices for storing information and instructions, such as a magnetic hard disk 841 and/or a removable media drive 842 (e.g., floppy disk drive, compact disc drive, tape drive, flash drive, and/or solid state drive). Storage devices 840 may be added to the computer system 810 using an appropriate device interface (e.g., a small computer system interface (SCSI), integrated device electronics (IDE), Universal Serial Bus (USB), or FireWire). Storage devices 841, 842 may be external to the computer system 810.

The computer system 810 may also include a field device interface 865 coupled to the system bus 821 to control a field device 866, such as a device used in a production line. The computer system 810 may include a user input interface or GUI 861, which may comprise one or more input devices, such as a keyboard, touchscreen, tablet and/or a pointing device, for interacting with a computer user and providing information to the processors 820.

The computer system 810 may perform a portion or all of the processing steps of embodiments of the invention in response to the processors 820 executing one or more sequences of one or more instructions contained in a memory, such as the system memory 830. Such instructions may be read into the system memory 830 from another computer readable medium of storage 840, such as the magnetic hard disk 841 or the removable media drive 842. The magnetic hard disk 841 and/or removable media drive 842 may contain one or more data stores and data files used by embodiments of the present disclosure. The data store 840 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 820 may also be employed in a multi-processing arrangement to execute the one or more sequences of instructions contained in system memory 830. In alternative embodiments, hardwired circuitry may be used in place of or in combination with software instructions. Thus, embodiments are not limited to any specific combination of hardware circuitry and software.

As stated above, the computer system 810 may include at least one computer readable medium or memory for holding instructions programmed according to embodiments of the invention and for containing data structures, tables, records, or other data described herein. The term "computer readable medium" as used herein refers to any medium that participates in providing instructions to the processors 820 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 841 or removable media drive 842. Non-limiting examples of volatile media include dynamic memory, such as system memory 830. Non-limiting examples of transmission media include coaxial cables, copper wire, and fiber optics, including the wires that make up the system bus 821. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 800 may further include the computer system 810 operating in a networked environment using logical connections to one or more remote computers, such as remote computing device 880. The network interface 870 may enable communication, for example, with other remote devices 880 or systems and/or the storage devices 841, 842 via the network 871. Remote computing device 880 may be a personal computer (laptop or desktop), a mobile device, a server, a router, a network PC, a peer device or other common network node, and typically includes many or all of the elements described above relative to computer system 810. When used in a networking environment, computer system 810 may include modem 872 for establishing communications over a network 871, such as the Internet. Modem 872 may be connected to system bus 821 via user network interface 870, or via another appropriate mechanism.

Network 871 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 810 and other computers (e.g., remote computing device 880). The network 871 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 871.

It should be appreciated that the program modules, applications, computer-executable instructions, code, or the like depicted in FIG. 8 as being stored in the system memory 830 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 810, the remote device 880, and/or hosted on other computing device(s) accessible via one or more of the network(s) 871, may be provided to support functionality provided by the program modules, applications, or computer-executable code depicted in the figures and/or additional or alternate functionality. Further, functionality may be modularized differently such that processing described as being supported collectively by the collection of program modules depicted in the figures may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in the figures may be implemented, at least partially, in hardware and/or firmware across any number of devices.

It should further be appreciated that the computer system 810 may include alternate and/or additional hardware, software, or firmware components beyond those described or depicted without departing from the scope of the disclosure. More particularly, it should be appreciated that software, firmware, or hardware components depicted as forming part of the computer system 810 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method performed within an industrial system that comprises a plurality of machines that define respective hardware and automation services associated with the hardware, the method comprising:

discovering, by a discover module of the industrial system, the plurality of machines and the associated automation services;

based on discovering the plurality of machines and the associated automation services, building a catalog of automation services;

obtaining, by a match module of the industrial system, one or more production goals associated with an product;

at a runtime of the industrial system, based on the one or more production goals, selecting a set of the automation services so as to define a composite service; and during the runtime of the industrial system, triggering the composite service so as to produce the product;

wherein discovering further comprises:

continuously interrogating, by the discover module, the automation services;

in response to the interrogating, receiving respective statuses from the automation services; and based on the statuses, updating the catalog so as to define a live catalog of available automation services that changes over time.

2. The method of claim 1, the method further comprising:

responsive to the triggering, producing the product using a set of the plurality of machines associated with the set of automation services.

3. The method of claim 2, the method further comprising:

while producing the product, identifying one or more new automation services; and based on the one or more new automation services, selecting a different set of the automation services so as to define the composite service.

4. The method of claim 2, the method further comprising:

based on a change in a policy associated with the one or more production goals, selecting a different set of the automation services so as to define a different composite service; and during the runtime of the industrial system, triggering the different composite service so as to produce the product.

5. An industrial system, the industrial system comprising:

a processor; and a memory storing instructions that, when executed by the processor, configure the system to:

discover a plurality of machines and automation services associated with the machines;

based on discovering the plurality of machines and the associated automation services, build a catalog of automation services;

obtain one or more production goals associated with a product;

at a runtime of the industrial system, based on the one or more production goals, select a set of the automation services so as to define a composite service; and during the runtime of the industrial system, trigger the composite service so as to produce the product;

the memory further storing instructions that, when executed by the processor, further configure the system to:

continuously interrogate the automation services;

in response to the interrogating, receive respective statuses from the automation services; and based on the statuses, update the catalog so as to define a live catalog of available automation services that changes over time.

6. The system of claim 5, the memory further storing instructions that, when executed by the processor, further configure the system to:

responsive to the triggering, produce the product using a set of the plurality of machines associated with the set of automation services.

7. The system of claim 6, the memory further storing instructions that, when executed by the processor, further configure the system to:

while producing the product, identify one or more new automation services; and based on the one or more new automation services, select a different set of the automation services so as to define the composite service.

8. The system of claim 6, the memory further storing instructions that, when executed by the processor, further configure the system to:

based on a change in a policy associated with the one or more production goals, select a different set of the automation services so as to define a different composite service; and during the runtime of the industrial system, trigger the different composite service so as to produce the product.

\* \* \* \* \*